Nov. 16, 1937.  F. W. DIPPEL  2,099,105
INSTRUMENT PANEL OIL LEVEL INDICATOR
Filed Jan. 10, 1936
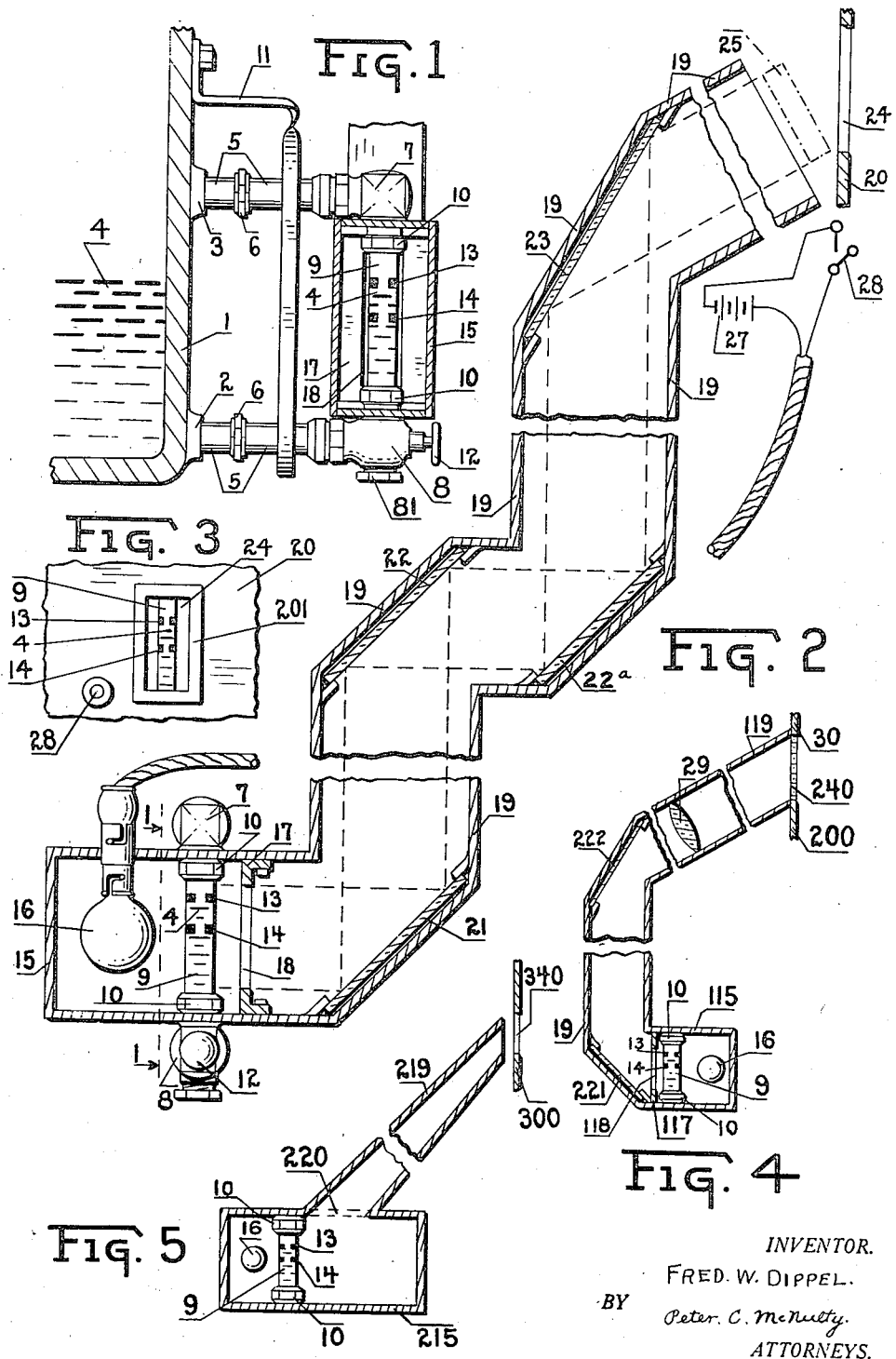
INVENTOR.
FRED. W. DIPPEL.
BY Peter C. McNulty.
ATTORNEYS.

Patented Nov. 16, 1937

2,099,105

UNITED STATES PATENT OFFICE 2,099,105

INSTRUMENT PANEL OIL LEVEL INDICATOR

Frederick William Dippel, Milwaukee, Wis.

Application January 10, 1936, Serial No. 58,546

2 Claims. (Cl. 73—327)

This invention relates to improvements in devices for use in the instrument panel of automobiles to show the true level of the lubricating oil in the engine of the automobile or of the gasoline in the fuel tank.

Many efforts have been made ever since automobiles have been in use to provide some reliable means for indicating the exact level of the lubricating oil in the engine of the automobile. One of these devices provides on the instrument panel of the car a tube containing a column of liquid the top surface of which will rise and fall corresponding to the oil level in the engine. A scale along side of the column of liquid enables the driver to estimate how much oil is in the oil reservoir of the engine crank case.

Devices of this kind give trouble due to several conditions. For instance, the indicating liquid may change its condition with extremes of temperature and may as a whole read high or low showing need of oil when none is needed or what is worse may show no oil is needed when the oil is so low as to fail to properly lubricate the engine. Users of these devices must make allowance for these errors in reading, thus continually guessing how much the error of the indicator is.

A number of float controlled indicating oil level gauges have been installed on automobile engines, but the hood must be raised to read the gauge or in one type the reading must be made through the louvers in the side of the hood. Many cars have gauges in the instrument panel that indicate the pressure of the lubricating oil, but which do not attempt to indicate either the oil level or the condition of the oil. In almost all cars a measuring rod is provided which may be inserted in the oil reservoir and withdrawn to find out how much oil is in the reservoir. All such measurements can only be made after the hood of the car has been raised.

Many various devices have been employed for indicating at the instrument panel the level of the gasoline in the fuel tank, most of which use some form of float or pressure control.

In this invention I have as a principal object the showing of the actual level of the liquid in the oil reservoir of the engine or of the fuel in the fuel tank to the car driver at the instrument panel so that the driver may actually see the liquid at the actual height that it has at any given time and may also observe its color condition as when the oil becomes dirty through use.

In order to accomplish this object I provide a transparent gauge connected with the liquid in the oil reservoir or with the fuel in the fuel tank, and a means for throwing a light on or through the column of liquid in the transparent glass member of the gauge. When applied to the oil reservoir the color of the oil will show in considerable contrast to the glass. When applied to the fuel tank the contrast is not so great as with the oil. I also provide means whereby the lighted gauge may be seen at the instrument panel or other desirable position in the car body.

In the drawing which is made a part of the specification I have shown one preferred and two modified embodiments of the invention as applied to the oil reservoir of an automobile and I have described these in the specification. I have also explained the application of the invention to the fuel tank of an automobile.

In the drawing:

Fig. 1 is a sectional view on the line 1—1 of Fig. 2 and shows a transparent gauge connected to the crank case of an automobile so that the level of the oil within the crank case will appear in the gauge outside of the crank case.

Fig. 2 is a side view of Fig 1 omitting the engine crank case wall and with the housing in section and shows a means for making the gauge and the oil level therein visible through an opening in the instrument board of the automobile.

Fig. 3 shows a segment of the instrument panel with the opening therein through which the oil gauge is seen.

Fig. 4 shows a modified form of the invention as applied to an oil reservoir using a lens in the tube and a ground glass on the instrument panel.

Fig. 5 shows another modified form of the invention also applied to an oil reservoir without the use of either mirrors or lens.

In Fig. 1, 1 is a portion of the oil reservoir of the crank case of an automobile shown in section. 2 is a threaded opening in the crank case under the oil level and adjacent the bottom of the reservoir 1 for connection of a gauge thereto. 3 is a similar threaded opening in the reservoir 1 above the oil level. 4 shows the oil in the reservoir 1 and in the gauge glass. An oil level gauge is connected with the reservoir 1 by means of the openings 2 and 3 and comprises the pipe nipples 5, unions 6, upper gauge glass elbow 7, lower gauge glass elbow and valve 8 and a transparent gauge glass member 9. The gauge glass is fitted into the elbows and made liquid tight by the unions 10 and the packing within them. When the gauge has been connected to the oil reservoir 1 of the crank case of an automobile the height of the oil in the crank case will be shown in the gauge glass 9 in which the oil level will always be the same as in the crank case reservoir. A supporting strap 11 is secured to the nipples 5 and the wall of the reservoir 1 to take the strain of vibration off the gauge when the car is in operation. The lower elbow 8 is provided with a plug 81 and a valve 12 by means of which the oil may be shut off if it is necessary to replace the gauge glass 9. The gauge glass 9 may be provided with a mark 13 to indicate the highest level to which oil is to be put into the reservoir 1 and with a mark 14 to indicate the lowest level to which the oil should be allowed to go before supplying additional oil. When the level of the oil is between the marks 13 and 14 there is sufficient oil in the reservoir for proper lubrication of the automobile engine.

The location of the gauge just described when installed on most makes of automobiles is so far below the instrument panel of the automobile that some means must be provided for making it visible at the instrument panel so that the driver of the car may actually see the oil gauge to determine if the oil in the reservoir is at a proper height.

Referring now to Fig. 2 surrounding the transparent gauge glass 10 is placed a housing 15 closed on all sides but one. A lamp 16 is provided in one portion of the housing 15 for illumination of the gauge glass 9 and the oil therein. The open side of the housing 15 is partially closed by a partition wall 17 secured to the housing 15 and having an opening 18 therethrough. The opening 18 is generally rectangular in shape and wider than the glass 9 and about as long as the part of the glass that is shown between the unions 10. This opening 18 is clearly shown in Fig. 1. This construction provides a light box with means for projecting the image of the oil gauge glass therefrom through the slot 18 as shown in Fig. 1. Connected with the housing 15 is a tubing 19 generally rectangular in shape, closed at the lower end and open at the upper end. This tubing extends from the gauge glass chamber 15 to behind the instrument panel 20. Parts of the tube are vertical, horizontal and diagonal as shown in Fig. 2 to extend from the gauge glass chamber 15 to adjacent the rear of the instrument panel 20. The diagonal portions of the tubular member 19 serve as supports for the mirrors 21, 22a, 22 and 23 which serve to reflect the lighted image of the gauge glass 9 to where it may be seen in an upright position through the opening 24 in the instrument panel 20, an ornamental bead 201 may be used around the edges of the opening 24.

I have shown at 25 in dot and dash lines the gauge glass 9 as it will appear to the driver through the opening 24. This also is shown in solid lines in Fig. 3.

The dotted lines within the tubular member 19 show the reflection of the image of the gauge glass 9. The mirrors 21, and 22 and 22a being placed at a 45° angle to the vertical wall of the tubular member 19 and the mirror 23 at a 30° angle to this vertical wall. Each mirror may be held in place by clips 26 secured to the housing or any other suitable way.

I have shown a lamp 16 in the housing 15 which may be lighted from the storage battery 27. A switch 28 on the instrument panel 20 may be closed when it is desired to observe the height of the oil in the reservoir as shown in the gauge glass 9. At all other times the switch 28 should be in open position.

The embodiment of Figs. 1, 2 and 3 requires the observer to look downwardly into the opening 24 in the panel 20 and place the eye in position to see the reflected image in the mirror 23.

It may, however, be desirable to show the image of the oil gauge glass 9 upon a translucent screen inserted in the instrument panel of the car where it may be observed by the driver or others when the lamp is lighted without having to look down into the tube.

In the modification shown in Fig. 4 a ground glass 30 is placed in the opening 240 in the instrument panel 200 and the means for focusing the image in upright position upon this ground glass where it will be visible to occupants of the car when the lamp is lighted are as follows:

Around the gauge glass 9 and lamp 16, Fig. 4 is placed the housing 115 closed on all sides but one. A partition 117 is placed on this open side and fastened to the housing. The partition is provided with a rectangular slot 118 thus forming a light box from which the image of the illuminated gauge glass and the oil therein are projected similar to that shown in Fig. 1. The engine parts and connections thereto for the oil gauge have been omitted in Fig. 4. The housing and tubular parts are shown in section and broken for convenience in drawing. A tubular passageway 119 is secured to the housing 117 and connects from the housing to the instrument panel 200 as shown in Fig. 4. This tubular member is closed on all sides except at the upper end and serves as support for the mirrors and lens used to bring the image to the ground glass. In a hole 240 in the instrument panel 200 is fitted a translucent screen 30, the tubular member 119 is provided with vertical and diagonal parts as shown in Fig. 4. The image of the oil gauge glass is first received in a mirror 221 placed at 45° to the vertical wall of 119 and reflects the image upwardly to the mirror 222 which is placed at 30° to the vertical. The image reflected in this mirror will be upside down if viewed downwardly through the hole 240 in the panel 200. I place a lens 29 in the tubular member 119 between the mirror 222 and the ground glass 30 to invert the image to upright position and I adjust the lens to focus the image sharply on the translucent screen 30 and of a size that will show the part of the oil gauge glass 9 between the unions 10 upon the ground glass 30.

The location of the lens 29 will vary with different conditions, but the correct location for any given condition may readily be determined and the lens fixed to the tubular member 119 at that point in any suitable manner.

The lamp 16 is to be connected and controlled by a switch as explained when describing the embodiment of Figs. 1, 2 and 3. The lens of course will make this type of installation cost more than the use of reflectors only.

In some cases the vertical distance between the instrument panel and the location of the oil gauge glass may be such that no reflectors are required. For such cases the embodiment shown in Fig. 5 may be used. In this figure I have again shown the oil gauge glass 9 omitting the engine parts and the connections thereto. I have shown the lamp 16 for lighting the gauge. It may be placed on either side of the gauge glass. I have placed around the gauge and lamp a housing 215 closed on all sides and with an opening in the top wall into which is secured a tubular member 219 leading to an opening 340 in the instrument panel. The lamp 16 is to be connected and controlled as previously described. When the lamp is lighted an observer may look through the opening 340 and see the oil level in the gauge glass 9 directly.

In the operation and use of this invention the driver of the car may at will close the switch 28 which will light the lamp 16 and the exact level of the liquid in the gauge glass can be actually seen. When used as an oil level gauge the condition of the oil will also be apparent as clean oil will show a different color than dirty oil.

When the invention is to be applied to a fuel tank to show the height of the fuel therein it may be desirable to extend the tube from the light box into the rear portion of the car body instead of to the instrument panel. When making such installation it would be preferable to use a transparent wall between the lamp 16 and the gauge glass 9 to completely cut off the lamp box from the gauge glass. Also, both the lamp compartment and the gauge glass compartment should be provided with shielded openings to the atmosphere.

It will be seen that I have provided a means for truly showing to a car user the exact level of liquid in the engine oil reservoir or the fuel tank of an automobile without the interposition of moving parts that may get out of order and show incorrect readings. I have also eliminated the necessity for raising the hood of an automobile to determine the level of the oil in the engine and for inserting a measuring rod in either the oil reservoir or fuel tank of an automobile.

What I claim is:

1. In an automobile including a driver's position, an engine having an oil reservoir, and an apertured partition between the engine and the driver's position, an oil gauge and periscope unit supported from and secured in its entirety to the engine, said unit being movable with the engine when the engine moves relative to said apertured partition, said unit including an oil gauge in connection with said reservoir and visible at the engine, and a periscope comprising a tubular casing having its lower end in communication with said gauge and extending substantially upwardly therefrom, said casing having its upper end positioned so that the gauge may be viewed through the aperture in said partition and with the upper end movable relative to said apertured partition.

2. In an automobile including a driver's position, an engine having an oil reservoir and an apertured partition between the engine and the driver's position, an oil gauge and periscope unit supported from and secured in its entirety to the engine, said unit being movable with the engine when the engine moves relative to said apertured partition, said unit including an oil gauge in connection with said reservoir and visible at the engine, and a periscope comprising a tubular casing having its lower end in communication with said gauge and extending substantially upwardly therefrom, said casing having its upper end positioned so that the gauge may be viewed through the aperture in said partition, and with the upper end movable relative to said apertured partition, and means for illuminating said oil gauge so that it will be visible through said periscope, said unit also having an opening at the gauge so that the gauge is also visible from the exterior of the unit.

FREDERICK WILLIAM DIPPEL.